United States Patent [19]

Kunde

[11] Patent Number: 5,872,228
[45] Date of Patent: Feb. 16, 1999

[54] PROCESS FOR THE PREPARATION OF REACTIVE AZO DYES

[75] Inventor: Klaus Kunde, Neunkirchen-Seelscheid, Germany

[73] Assignee: Bayer AG, Germany

[21] Appl. No.: 875,812

[22] PCT Filed: Jan. 25, 1996

[86] PCT No.: PCT/EP96/00296

§ 371 Date: Aug. 5, 1997

§ 102(e) Date: Aug. 5, 1997

[87] PCT Pub. No.: WO96/24637

PCT Pub. Date: Aug. 15, 1996

[30] Foreign Application Priority Data

Feb. 7, 1995 [DE] Germany ................. 195 03 889.4
Jul. 27, 1995 [DE] Germany ................. 195 27 438.5

[51] Int. Cl.$^6$ ................. C09B 43/12; C09B 43/136; C09B 43/16
[52] U.S. Cl. ................. 534/598; 534/599; 534/634; 534/638; 534/829; 534/873
[58] Field of Search ................. 534/599, 598

[56] References Cited

U.S. PATENT DOCUMENTS

| | | | |
|---|---|---|---|
| 3,225,027 | 12/1965 | Baker et al. | 534/643 |
| 4,511,507 | 4/1985 | Kayane et al. | 534/629 |
| 4,841,027 | 6/1989 | Kayane et al. | 534/599 |
| 5,350,838 | 9/1994 | Helle et al. | 534/638 |
| 5,512,663 | 4/1996 | Kunde | 534/633 |

FOREIGN PATENT DOCUMENTS

| | | |
|---|---|---|
| 0087113 | 8/1983 | European Pat. Off. . |
| 0090114 | 10/1983 | European Pat. Off. . |
| 0622424 | 11/1994 | European Pat. Off. . |
| 3118657 | 11/1982 | Germany . |
| 3316984 | 11/1984 | Germany . |

OTHER PUBLICATIONS

Le A 22 347, corresponding to DE–A–33 16 984, Process for preparing O–sulphonates of optionally substituted aminoaphthols, pp. 1–8, Nov. 15, 1984.
Derwent Abstract of JP 57–187,361, Nov. 18, 1982.
Derwent Abstract of JP 59–004,653, Jan. 11, 1984.

Primary Examiner—Fiona T. Powers
Attorney, Agent, or Firm—Connolly & Hutz

[57] ABSTRACT

Reactive dyestuffs of the formula (I)

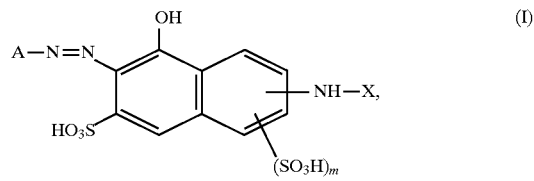

wherein

A denotes the radical of a diazo component and

X is a fibre-reactive heterocyclic radical
are obtained by hydrolysis of maleylated azo dyestuffs of the formula (IV)

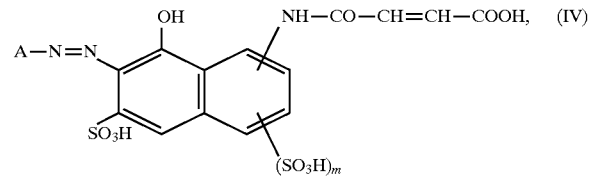

and subsequent reaction with reactive components of the formula X-Hal without intermediate isolation, the other substituents having the meaning given in the description.

15 Claims, No Drawings

PROCESS FOR THE PREPARATION OF REACTIVE AZO DYES

This application is a 371 of PCT/EP96/00296 filed Jan. 25, 1996.

The present invention relates to a process for the preparation of reactive azo dye-stuffs starting from maleylated aminoazo compounds.

The selectivity of the. coupling in the preparation of azo dyestuffs can be controlled, for example, by parameters such as the temperature and the pH (cf. U.S. Pat. No. 5,350,838). In DE-A 32 17 224 (U.S. Pat. No. 4,841,027), a certain orientation during the coupling is achieved by acylating the amino group of naphthalenesulphonic acid coupling components with an anhydride of a dibasic acid, such as maleic anhydride, before the coupling. The aminoazo compounds acylated in this way are then hydrolysed and intermediately isolated before they are reacted further with reactive components to give reactive dyestuffs.

A process has now been found for the preparation of reactive azo dyestuffs which, in the form of their free acid, correspond to the formula (I)

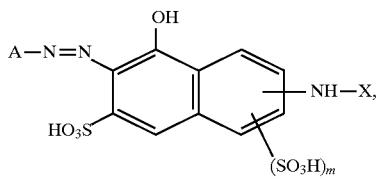

wherein m denotes 0 or 1,

A denotes the radical of a diazo component, in particular from the benzene or naphthalene series, and X denotes a fibre-reactive heterocyclic radical, which is characterized in that maleylated aminoazo dyestuffs of the formula (IV)

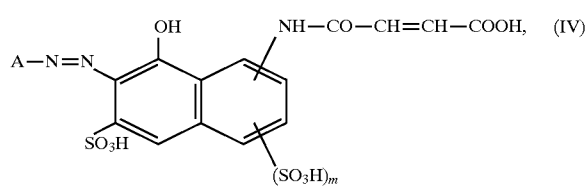

wherein

A and m have the abovementioned meaning, are hydrolysed and the compound obtained by this reaction is reacted, without intermediate isolation, with a reactive component of the formula (VI)

X-Hal     (VI)

wherein

X has the abovementioned meaning and

Hal represents halogen, in particular Cl or F.

In a preferred process procedure, reactive azo dyestuffs of the formula (I) wherein A denotes a benzene derivative of the general formula (II)

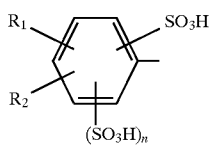

or a naphthalene derivative of the general formula (III)

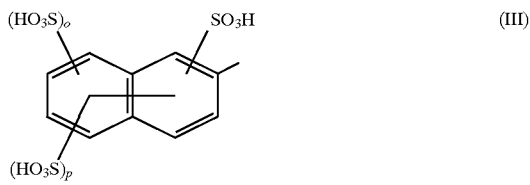

wherein $R_1$ and $R_2$ independently of one another represent hydrogen, halogen, $C_1$–$C_4$-alkyl, $C_1$–$C_4$-alkoxy or arylazo which is optionally substituted by substituents such as halogen, in particular F, Cl or Br, $C_1$–$C_4$-alkyl, $C_1$–$C_4$-alkoxy or $SO_3H$, in particular sulphophenylazo, and n, o and p independently of one another represent 0 or 1, are prepared.

In a preferred embodiment of the process according to the invention, compounds of the formula (I) wherein $R_1$ and $R_2$ independently of one another represent hydrogen, chlorine, fluorine, methyl, ethyl, methoxy, ethoxy or 4-sulphophenylazo, are prepared.

The compound obtained by hydrolysis of the maleylated aminoazo dyestuffs of the formula (IV) probably corresponds to the formula (V)

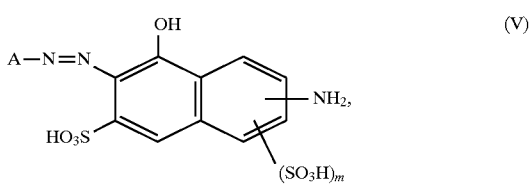

wherein

A and m have the broadest abovementioned meaning.

In a particular embodiment of the process according to the invention, those compounds of the formula (I) wherein A denotes a benzene derivative of the formula (II) which corresponds to the formula (VII)

or denotes a naphthalene derivative of the formula (III) which corresponds to the formula (VIII)

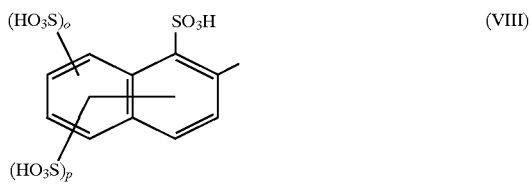

and $R_1$, $R_2$, n, o and p have the abovementioned meaning, are prepared.

The process according to the invention wherein compounds of the formula (IV) correspond to the formula (IX) or (X)

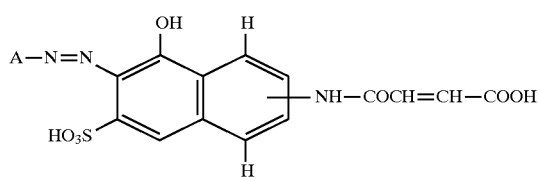

(IX)

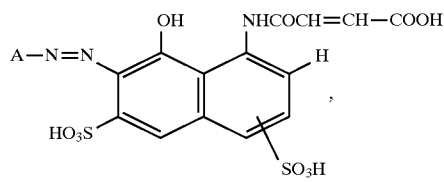

(X)

wherein

A has the broadest abovementioned meaning, is especially preferred.

The hydrolysis here is in general carried out in aqueous-alkaline solution, preferably at pH values $\geq 10$ and temperatures of 60° to 105° C.; bases which are used are alkali metal hydroxides or alkaline earth metal hydroxides, preferably sodium hydroxide, potassium hydroxide or lithium hydroxide.

However, the hydrolysis in aqueous-acid solution, preferably at pH values $\leq 4$ and temperatures of 60° to 105° C., is of greater importance; acids which are used are, in particular, mineral acids, preferably hydrochloric acid and sulphuric acid. Other process parameters for the hydrolysis are to be found, for example, in DE-A 3 217 224.

Suitable fibre-reactive heterocyclic radicals X, i.e. those which react with the OH or NH groups of the fibre under dyeing conditions to form covalent bonds, are, in particular, those which contain at least one reactive substituent bonded to a 5- or 6-membered aromatic heterocyclic ring, for example to a monoazine, diazine or triazine ring, in particular a pyridine, pyrimidine, pyridazine, pyrazine, thiazine, oxazine or asymmetric or symmetric triazine ring, or to such a ring system which has one or more fused-on aromatic carbocyclic rings, for example a quinoline, phthalazine, cinnoline, quinazoline, quinoxaline, acridine, phenazine and phenanthridine ring system.

Fibre-reactive radicals from the series consisting of the pyrimidines or the triazines are particularly suitable here.

Reactive substituents on the heterocyclic radical which may be mentioned are, for example, halogen (Cl, Br or F), ammonium, including hydrazinium, pyridinium, picolinium, carboxypyridinium, sulphonium, sulphonyl, azido ($N_3$), thiocyanato, thiolether, oxyether, sulphinic acid and sulphonic acid.

In particular, X can accordingly represent a radical of the formula

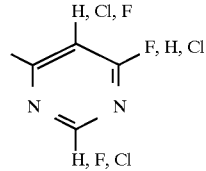

(XIV)

or represent a radical of the formula

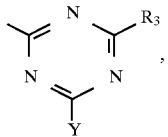

(XV)

wherein

Y represents Cl or F and $R_3$ represents F or Cl or denotes a radical of an aliphatic or aromatic amine, which optionally contains a further aminofunction or a radical of the formula $-SO_2-C_2H_4-OSO_3H$ or $-SO_2CH=CH_2$.

Fibre-reactive radicals X-Hal which can be mentioned as examples are 2,4,6-trichloro-1,3,5-triazine, 2,4,6-trifluoro-1,3,5-triazine, 2,4,6-trifluoro-5-chloro-pyrimidine, 2,4,6-trifluoropyrimidine, 4,6-difluoro-5-chloropyrimidine, 4,5,6-trifluoropyrimidine and the compounds of the formulae

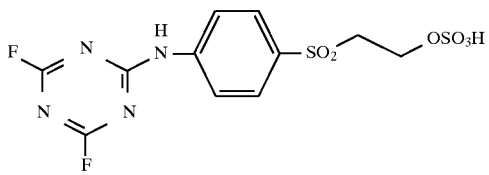

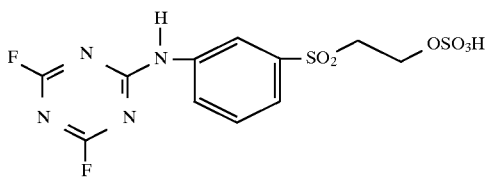

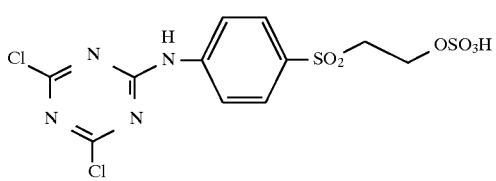

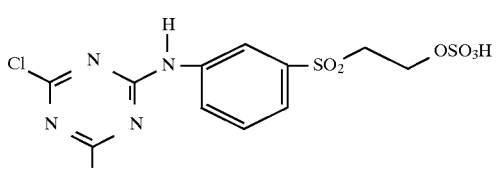

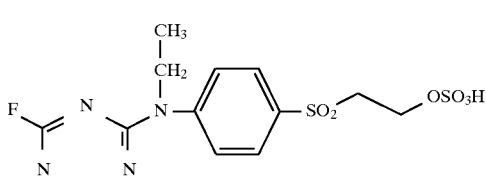

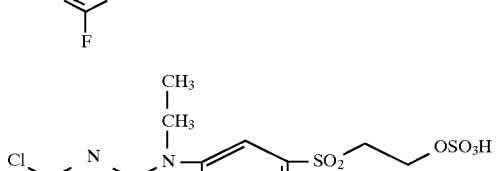

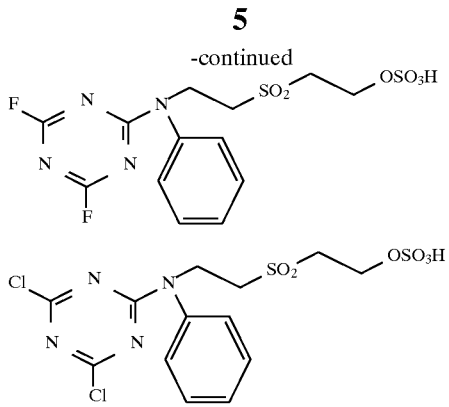

which are known, for example, from BP-A 87 113.

In a particular embodiment of the process according to the invention, dyestuffs of the formula (I) wherein X denotes a radical of the formula (XV) in which $R_3$ represents optionally substituted aliphatic or aromatic amino are obtained by reaction of compounds of the formula (I) wherein $R_3$ represents Cl or F with an aliphatic or aromatic amine $HR^3$, which optionally contains a further amino function or a radical of the formula $-SO_2C_2H_4OSO_3H$ or $-SO_2CH=CH_2$.

Amines of the formula $HR^3$ which are to be mentioned are, for example:

Ammonia, morpholine, aniline, N-methylaniline, N-ethylaniline, o-toluidine, orthanilic acid, metanilic acid, sulphanilic acid, 1,3-diaminobenzene, 1,4-diaminobenzene, 2,5-diaminobenzenesulphonic acid, 2,4-diaminobenzenesulphonic acid, 2,2'-benzidine-disulphonic acid, 1,2-diaminoethane, 1,3-diaminopropane, 1,2-diaminopropane, 4-aminophenyl β-sulphatoetliyl sulphone, 3-aminophenyl β-sulphatoethyl sulphone, 2-phenylaminoethyl 2'-sulphatoethyl sulphone, 2-methylami noethyl 2'-sul phatoethyl sulphone, 3-ethylaminophenyl l-sulphatoethylsulphone, taurine and N-methyltaurine.

The process conditions are described, for example, in EP-A 622 424. The reaction of the amine $HR^3$ here is preferably carried out without the corresponding triazine dyestuff having been isolated beforehand.

The preferred triazine dyestuffs which are still to be subjected to condensation with $HR^3$ are obtained by the process according to the invention, wherein X-Hal denotes cyanuric chloride or cyanuric fluoride.

The dyestuffs of the formula I obtained by the process according to the invention wherein X denotes a radical of the formula XV in which $R^3$ represents F or Cl and Y, A and m can have the abovementioned meaning are preferably doubled if they are reacted with diamines such as are mentioned as examples for $HR^3$.

These dyestuffs correspond to the formula

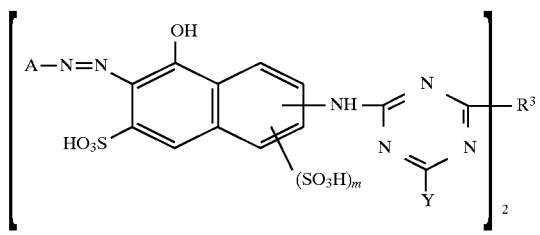

wherein R is a bivalent diamino radical.

A preferred embodiment of the process according to the invention is characterized in that the compounds of the formula (IV) are obtained by a procedure in which compounds of the formula (XI) or (XII)

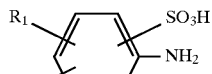

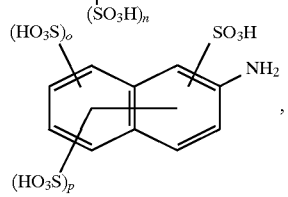

wherein
$R_1$, $R_2$, n, o and p have the broadest abovementioned meaning,
are diazotized and the diazotization products are coupled to compounds of the formula (XIII)

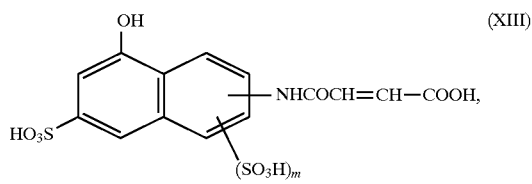

wherein
m has the broadest abovementioned meaning.
Compounds of the formula (XIII) are known from DE-A 3 217 224 and can be prepared as described there.

In a particular embodiment of the preparation process according to the invention, compounds of the formula (XI) or (XII) which correspond to the formula (XIa) or (XIIa)

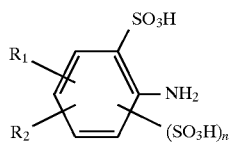

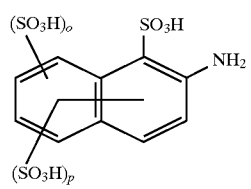

wherein
$R_1$, $R_2$, n, o and p have the broadest abovementioned meaning,
are diazotized.

Aminobenzenesulphonic acids of the general formula (XI) are, for example, orthanilic acid, metanilic acid, sulphanilic acid, 2-amino-4-methylbenzenesulphonic acid, 2-amino-4-methoxybenzenesulphonic acid, 2-amino-4-ethoxybenzenesulphonic acid, 4-amino-3-methoxybenzenesulphonic acid, 4-amino-3-methylbenzenesulphonic acid, 4-amino-5-methoxy-2-methylbenzenesulphonic acid, 2-amino-1,4-benzenedisulphonic acid, 4-amino-1,3-benzenedisulphonic acid, 2-amino-5-methyl-1,4-benzenedisulphonic acid, 2-amino-5-methoxy-1,4-benzenedisulphonic acid and 5-(4-sulphophenylazo)-2-aminobenzenesulphonic acid.

Aminonaphthalenesulphonic acid of the general formula (XII) are, for example, 2-amino-1-naphthalenesulphonic acid, 2-amino-1,5-naphthalenedisulphonic acid, 2-amino- 1,5,7-naphthalenetrisulphonic acid, 3-amino-2,5,7-naphthalenetrisulphonic acid, 3-amino-1,5-naphthalenedisulphonic acid and 3-amino-1,5,7-naphthalenetrisulphonic acid.

Aminonaphtholsulphonic acid derivatives of the general formula (XIII) are obtained, for example, by reaction of maleic anhydride with, for example, 4-amino-5-hydroxy-2,7-naphthalenedisulphonic acid, 4-amino-5-hydroxy-1,7-naphthalenedisulphonic acid, 6-amino-4-hydroxy-2-naphthalenesulphonic acid or 7-amino-4-hydroxy-2-naphthalenesulphonic acid; the reaction is described, for example, in DE-A-33 16 984, DE-A 31 18 657 and in EP-A 90 114.

The diazotization of the aminobenzene derivatives of the general formula (XI) or of the aminonaphthalenederivatives of the general formula (XII) is carried out by processes known per se by the action of at least one molar equivalent of sodium nitrite in the presence of at least two molar equivalents of a strong acid.

The coupling of the diazonium compounds thus obtained to aminonaphthol derivatives of the general formula (XIII) is carried out in a manner known per se in aqueous media, preferably in the presence of acid-binding agents, such as, for example, sodium bicarbonate, sodium carbonate, sodium hydroxide, potassium carbonate, potassium hydroxide, lithium carbonate or lithium hydroxide, at pH values of between 3 and 10, preferably between 4 and 8, at temperatures between –5° C. and 30° C.

The formulae given are those of the free acid. The salts, in particular the alkaline metal salts, such as sodium, potassium or lithium salts, are in general obtained in the preparation.

The reactive dyestuffs thus prepared are outstandingly suitable for dyeing and printing naturally occurring or synthetic substrates containing hydroxyl or amide groups, such as silk, leather, wool or synthetic polyamide fibres, and in particular cellulose-containing materials having a fibrous structure, such as linen, cellulose, regenerated cellulose and, above all, cotton.

EXAMPLE 1

31.9 g of H acid (1-amino-8-hydroxy-naphthalene-3,6-disulphonic acid) were dissolved in water under neutral conditions at a temperature of 20° C. under an inert gas. 14.7 g of maleic anhydride were added. The pH was allowed to fall to 4.5 and was kept constant at this value with sodium carbonate solution; the temperature was maintained by external cooling.

30.3 g of 2-amino-1,5-naphthalenedisulphonic acid were dissolved in water at a temperature of 0° C. with the addition of hydrochloric acid in an amount such that, after addition of 6.9 g of sodium nitrite, a pH of 1.5 was not exceeded; the temperature was maintained by external cooling. When the diazotization had ended, any excess nitrite was destroyed with amidosulphonic acid. When the acylation of the H acid had ended, the suspension of the diazonium salt was slowly added dropwise to the suspension of the N-maleyl-H-acid. The pH of the coupling mixture was raised here to 6.5 with sodium carbonate solution and was maintained during the coupling; the temperature was maintained at 20° C. by external cooling.

A solution which comprised the product of the formula (I)

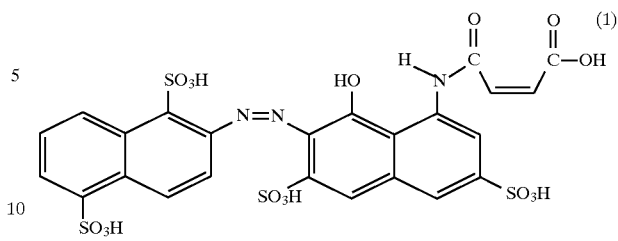

in a yield of 95% of theory was obtained.

EXAMPLE 2

If an equimolar amount of 3-amino-8-hydroxy-naphthalene-6-sulphonic acid (I acid) was used instead of the H acid employed in Example 1, the compound of the formula (2)

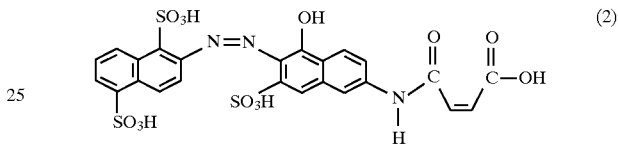

was obtained in a yield of 90% of theory.

EXAMPLES 3 AND 4

If equimolar amounts of 2-amino-1-naphthalenesulphonic acid or orthanilic acid were used instead of the 2-amino-1,5-naphthalenedisulphonic acid employed in Example 1, the compounds of the formulae (3) and (4)

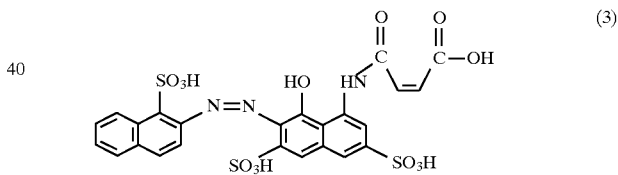

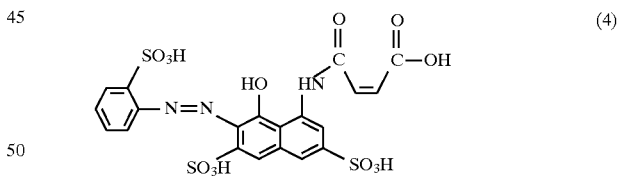

were obtained in yields of in each case 92% of theory.

EXAMPLES 5, 6 AND 7

If equimolar amounts of 2-amino-5-methylbenzenesulphonic acid, 2-amino-5-methoxybenzenesulphonic acid or 2-amino-5-(4'-sulphophenylazo)benzenesulphonic acid were employed instead of the 2-amino-1,5-naphthalenedisulphonic acid employed in Example 2, the compounds of the formulae (5), (6) and (7)

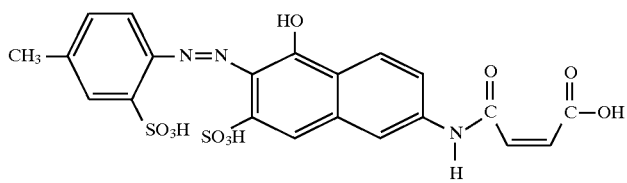

(5)

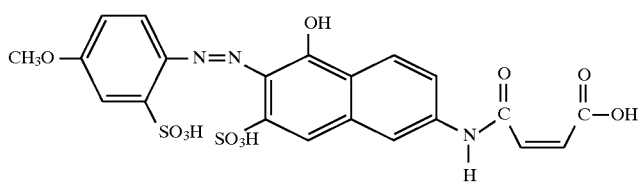

(6)

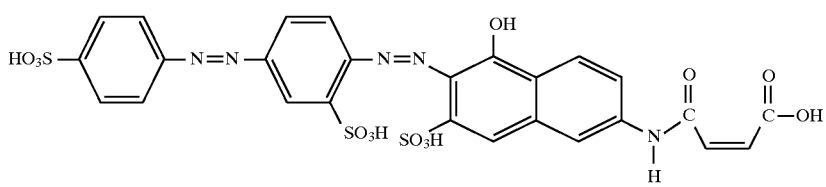

(7)

were obtained.

Use example

The pH of the solution, obtained in Example 1, of the product of the formula (1) was brought to 1.4 with hydrochloric acid and the solution was then stirred at 70° C. for 45 minutes, the maleyl radical being split off. The solution was cooled to 20° C. The pH was brought to 3.7 with sodium carbonate solution. After addition of 19.6 g of cyanuric chloride, the pH was kept constant with sodium carbonate solution and the temperature was kept constant by external cooling. When the condensation had ended, 6.1 g of 1,4-diaminobenzene were dissolved in water at pH 6 with hydrochloric acid and the solution was added to the suspension obtained above. The batch was heated to 30° C. and the pH was brought to 6.5 with sodium carbonate solution and maintained until the reaction had ended. Finally, the pH was brought to 8 with sodium carbonate solution and the dyestuff solution was then concentrated to dryness under reduced pressure. 160 g of a dark red powder which comprised the dyestuff of the formula (8) were obtained.

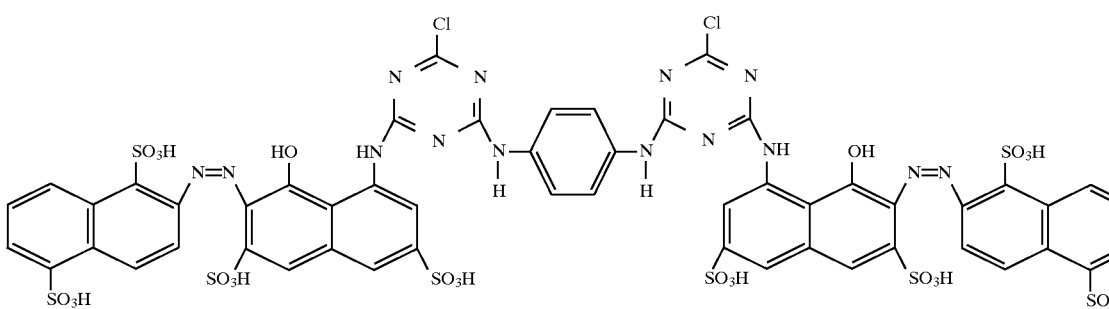

(8)

Further dyestuffs which were obtained using the coupling products from Examples I to 7, after hydrolysis to give the corresponding aminoazo compounds, by reaction with 2,4,6-trifluoro-1,3,5-triazine (TFT) or 2,4,6-trichloro-1,3,5-triazine (TCT) and the amine shown, are listed in the following table.

| Coupling product from example | Triazine | Amine | Dyestuff |
|---|---|---|---|
| 5 | TCT | CH₃–NH–CH₂–CH₂–SO₂–CH₂–CH₂–OSO₃H | (9) |
| 6 | TFT | C₆H₅–N(C₂H₅)–H | (10) |
| 6 | TCT | H₂N–CH₂CH₂CH₂–SO₂–CH₂CH₂CH₂–OSO₃H | (11) |

-continued

| Coupling product from example | Triazine | Amine | Dyestuff |
|---|---|---|---|
| 6 | TFT | $CH_3-\underset{H}{N}-(CH_2)_2-SO_2-(CH_2)_2-OSO_3H$ | (12) |
| 6 | TCT | 3-($C_2H_5$)NH-C$_6$H$_4$-SO$_2$-(CH$_2$)$_2$-OSO$_3$H | (13) |
| 7 | TFT | $CH_3-\underset{H}{N}-(CH_2)_2-SO_3H$ | (14) |

-continued

| Coupling product from example | Triazine | Amine | Dyestuff |
|---|---|---|---|
| 1 | TCT | C₆H₅-N(C₂H₅)-H | (15) |
| 2 | TCT | C₆H₅-N(H)-(CH₂)₂-SO₂-(CH₂)₂-OSO₃H | (16) |
| 2 | TFT | CH₃-N(H)-(CH₂)₂-SO₂-(CH₂)₂-OSO₃H | (17) |

-continued

| Coupling product from example | Triazine | Amine | Dyestuff |
|---|---|---|---|
| 3 | TCT | C₆H₅-NH-C₂H₅ | (18) |
| 4 | TCT | 1,4-H₂N-C₆H₄-NH₂ | (19) |
| 4 | TCT | 3-(HO₃SO-(CH₂)₂-SO₂)-C₆H₄-NH₂ | (20) |

-continued

| Coupling product from example | Triazine | Amine | Dyestuff |
|---|---|---|---|
| 7 | TFT | $CH_3-NH-(CH_2)_2-SO_2-(CH_2)_2-OSO_3H$ | (21) |
| 1 | TCT | $CH_3-NH-(CH_2)_2-SO_2-(CH_2)_2-OSO_3H$ | |
| 2 | TCT | biphenyl diamine disulfonic acid | (22) |

-continued
| Coupling product from example | Triazine | Amine | Dyestuff |
|---|---|---|---|
| 2 | TFT | $H_2N-(CH_2)_3-SO_2-(CH_2)_2-OSO_3H$ | 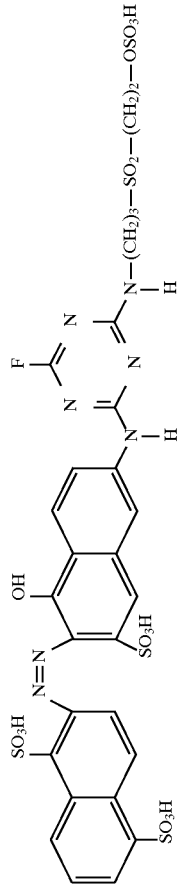 (23) (24) |

I claim:
1. Process for the preparation of compounds which, in the form of their free acid, correspond to the formula (I)

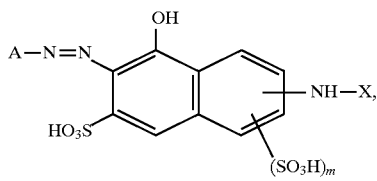

wherein
m denotes 0 or 1,
A denotes the radical of a diazo component and
X denotes a fibre-reactive heterocyclic radical,
characterized in that maleylated aminoazo dyestuffs of the formula (IV)

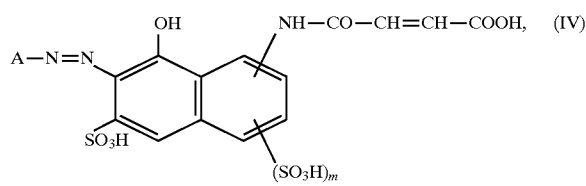

wherein
A and m have the abovementioned meaning,
are hydrolysed and the compound obtained by this reaction is reacted, without intermediate isolation, with a reactive component of the formula (VI)

X-Hal    (VI)

wherein
X has the abovementioned meaning and
Hal represents halogen.

2. Process according to claim 1, characterized in that A denotes a benzene derivative of the general formula (II)

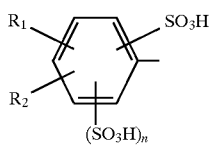

or a naphthalene derivative of the general formula (III)

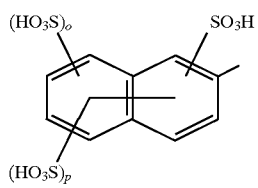

wherein
R$_1$ and R$_2$ independently of one another represent hydrogen, halogen, C$_1$–C$_4$-alkyl, C$_1$–C$_4$-alkoxy or arylazo which is optionally substituted by halogen, C$_1$–C$_4$-alkyl, C$_1$–C$_4$-alkoxy or SO$_3$H, and
n, o and p independently of one another represent 0 or 1.

3. Process according to claim 2, characterized in that R$_1$ and R$_2$ independently of one another represent hydrogen, chlorine, fluorine, methyl, ethyl, methoxy, ethoxy or 4-sulphophenylazo.

4. Process according to claim 2, characterized in that A denotes a benzene derivative of the formula (II) which corresponds to the formula (VII)

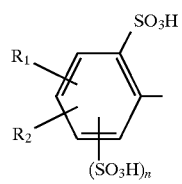

or denotes a naphthalene derivative of the formula (III) which corresponds to the formula (VIII)

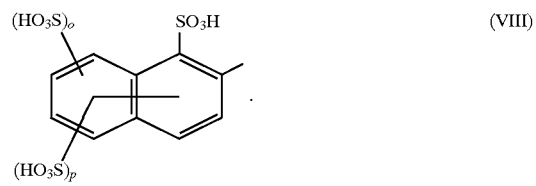

5. Process according to claim 1, characterized in that the compounds of the formula (IV) correspond to the formula (IX) or (X)

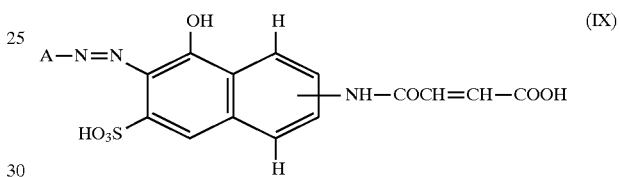

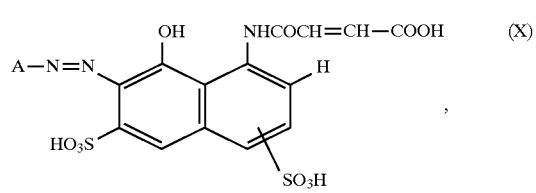

wherein

A has the meaning given in claim 1.

6. Process according to claim 1, characterized in that the hydrolysis is carried out in aqueous-alkaline solution or in aqueous-acid solution at a temperature of 60° to 105° C.

7. Process according to claim 2, characterized in that the compounds of the formula (IV) are obtained by a procedure in which compounds of the formula (XI) or (XII)

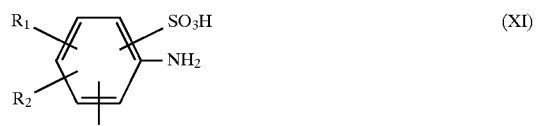

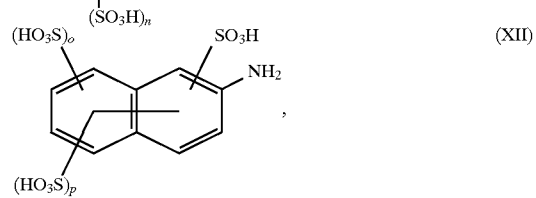

wherein

R$_1$, R$_2$, n, o and p have the meaning given in claim 2, are diazotized and the diazotization products are coupled to compounds of the formula (XIII)

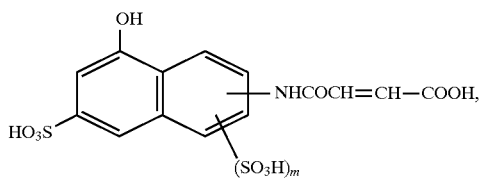

wherein m has the abovementioned meaning.

8. Process according to claim 7, characterized in that the compounds of the formula (XI) correspond to those of the formula (XIa) or the compounds of the formula (XII) correspond to those of the formula (XIIa)

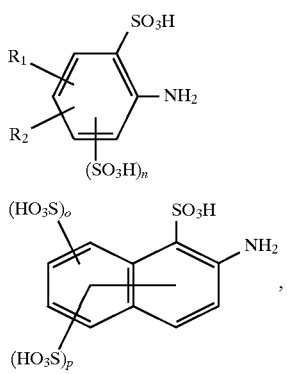

wherein $R_1$, $R_2$, n, o and p have the meaning given in claim 7.

9. Process according to claim 1, characterized in that the component employed as X-Hal is a reactive component in which the radical X contains at least one reactive substituent bonded to a 5- or 6-membered aromatic heterocyclic ring.

10. Process according to claim 1, characterized in that the component employed as X-Hal is a reactive component in which the radical X denotes a fibre-reactive radical from the series consisting of the pyrimidines or the triazines.

11. Process according to claim 1 for the preparation of compounds of the formula I wherein X represents a radical of the formula

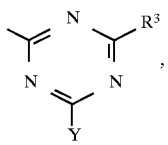

wherein

Y represents Cl or F and $R_3$ denotes a radical of an aliphatic or aromatic amine which optionally contains a further amino function or a radical of the formula —$SO_2$—$C_2$—$H_4$—$OSO_3H$ or —$SO_2CH_2$=$CH_2$, characterized in that compounds of the formula I wherein X represents a radical of the formula XV and $R^3$ denotes Cl or F are reacted with an aliphatic or aromatic amine HR3 which optionally contains a further amino function or a radical of the formula —$SO_2$—$C_2H_4$—$OSO_3H$ or $SO_2CH$=$CH$.

12. Process according to claim 11 for the preparation of compounds of the formula

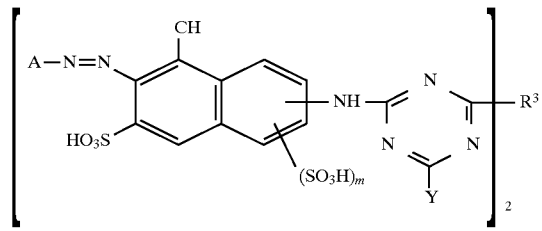

wherein $R^3$ denotes a diamino radical, characterized in that the amine $HR^3$ is a diamine.

13. A process according to claim 1 wherein Hal is Cl or F.

14. A process according to claim 2 wherein $R_1$ and $R_2$ independently represent arylazo which is substituted by F, Cl or Br.

15. A process according to claim 2 wherein $R_1$ and $R_2$ independently represent sulphophenylazo.

* * * * *